United States Patent
Schwalm et al.

(10) Patent No.: US 10,150,444 B1
(45) Date of Patent: Dec. 11, 2018

(54) FRANGIBLE BUMP STOP SUPPORT

(71) Applicant: Ford Global Technologies, LLC, Dearborn, MI (US)

(72) Inventors: Robert Schwalm, Windsor (CA); John Joseph Nizienski, Livonia, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/705,717

(22) Filed: Sep. 15, 2017

(51) Int. Cl.
*E05F 5/02* (2006.01)
*B60R 21/38* (2011.01)

(52) U.S. Cl.
CPC ............... *B60R 21/38* (2013.01); *E05F 5/02* (2013.01); *E05F 5/022* (2013.01); *E05F 5/025* (2013.01)

(58) Field of Classification Search
CPC ... B60R 21/34; B60R 21/38; B60R 2021/343; E05F 5/02; E05F 5/022; E05F 5/025
USPC .............. 16/86 R, 86 A; 296/193.11, 187.04
See application file for complete search history.

(56) References Cited

U.S. PATENT DOCUMENTS

| | | | | |
|---|---|---|---|---|
| 170,190 A * | 11/1875 | Pratt | ..................... | A47B 95/043 248/345.1 |
| 4,181,339 A * | 1/1980 | Rigsby | ..................... | E05F 5/10 16/82 |
| 6,095,481 A * | 8/2000 | Norkus | ................ | B60G 99/004 248/560 |
| 6,119,306 A * | 9/2000 | Antonucci | ............... | E05F 5/022 16/86 A |
| 6,308,927 B1 * | 10/2001 | Leahy | ..................... | E01F 9/635 248/530 |
| 6,507,976 B2 * | 1/2003 | Ichimaru | .................. | E05F 5/022 16/2.1 |
| 6,612,644 B2 * | 9/2003 | Ahn | ........................ | B60R 21/34 296/187.04 |
| 7,566,081 B2 * | 7/2009 | Aoyama | .................. | E05F 5/022 293/104 |
| 7,618,088 B2 * | 11/2009 | Bauer | ..................... | E05F 5/022 16/82 |
| 7,690,722 B2 * | 4/2010 | Boggess | ................. | B60R 21/34 296/187.04 |
| 7,878,578 B2 * | 2/2011 | Iwai | ........................ | B60R 21/34 180/69.2 |
| 8,056,965 B2 * | 11/2011 | Rosemann | .............. | E05F 5/022 16/86 A |
| 8,291,547 B2 * | 10/2012 | Ukai | ..................... | F16B 21/086 16/86 R |
| 8,407,857 B2 * | 4/2013 | Sugiyama | ............... | F16F 1/371 16/86 R |

(Continued)

FOREIGN PATENT DOCUMENTS

CN 205854072 U 1/2017
DE 102006057046 B3 2/2008

(Continued)

*Primary Examiner* — Jeffrey O'Brien
(74) *Attorney, Agent, or Firm* — Frank A. MacKenzie; Bejin Bieneman PLC

(57) ABSTRACT

A support assembly includes a bump stop having a shaft. The support assembly includes an insert having a guide ring disposed around the shaft, a bump stop support supporting the bump stop, and a column connecting the guide ring to the bump stop support. The column is breakable relative to the guide ring and the bump stop support.

19 Claims, 7 Drawing Sheets

(56) References Cited

U.S. PATENT DOCUMENTS

| | | | | |
|---|---|---|---|---|
| 8,616,622 | B2* | 12/2013 | Davis | B60R 21/34 180/69.2 |
| 8,720,975 | B1* | 5/2014 | Perez | B60Q 1/0491 296/187.04 |
| 9,580,951 | B2* | 2/2017 | Duprez | E05F 5/022 |
| 2004/0025290 | A1* | 2/2004 | Novarino | E05F 5/022 16/86 A |
| 2006/0064845 | A1* | 3/2006 | Fujii | B60R 21/34 16/82 |
| 2006/0101615 | A1* | 5/2006 | Pinzl | E05F 5/022 16/82 |
| 2008/0166206 | A1* | 7/2008 | Edland | F16B 21/086 411/510 |
| 2014/0091600 | A1* | 4/2014 | Lusky | E05F 5/022 296/207 |
| 2015/0121665 | A1* | 5/2015 | Kaji | F16B 21/086 24/458 |
| 2016/0303960 | A1* | 10/2016 | Yon | E05F 5/022 |
| 2017/0370140 | A1* | 12/2017 | Nakasone | B60R 7/06 |

FOREIGN PATENT DOCUMENTS

| | | |
|---|---|---|
| DE | 102010026725 B4 | 11/2014 |
| EP | 2435653 B1 | 7/2016 |
| FR | 2928679 B1 | 9/2009 |

* cited by examiner

FRANGIBLE BUMP STOP SUPPORT

BACKGROUND

A vehicle may include a bump stop that supports a hood of the vehicle. Specifically, the bump stop is supported by a body of the vehicle, and the bump stop supports the hood on the body when the hood is in a closed position. The bump stop prevents unwanted impact between the hood and the body as the hood is moved from an open position to the closed position, and positions the hood relative to the body when the hood is in the closed position.

DETAILED DESCRIPTION

Figure 1:
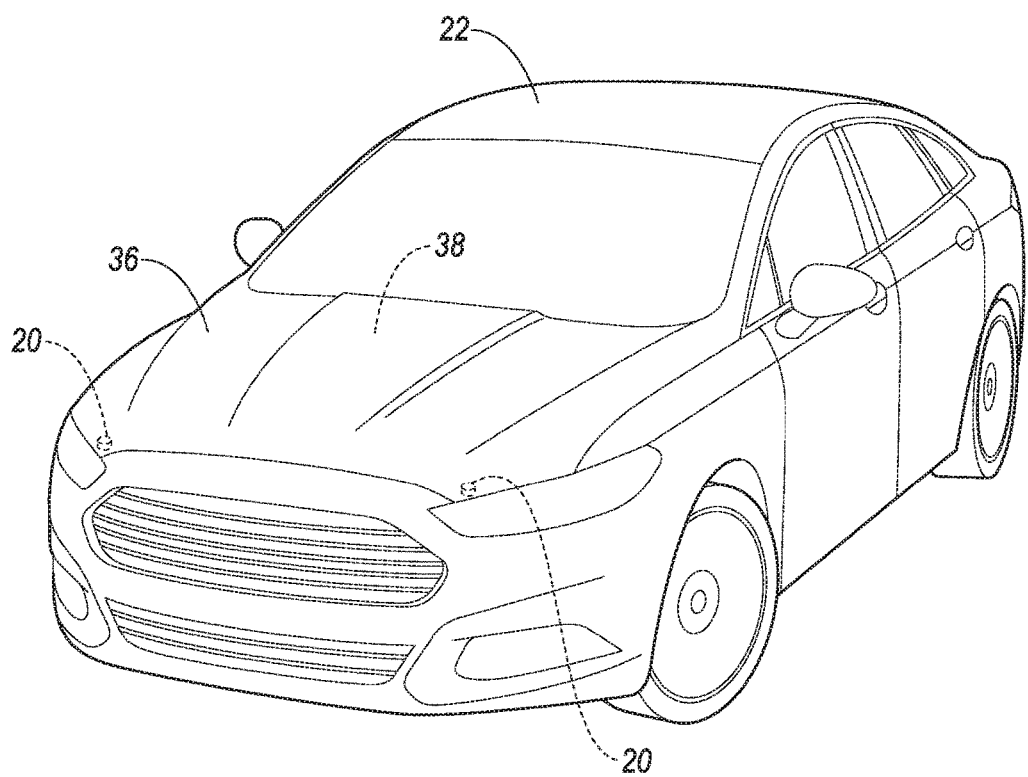
FIG. 1 is a front perspective view of a vehicle including a support assembly.

A support assembly includes a bump stop having a shaft. The support assembly includes an insert having a guide ring disposed around the shaft, a bump stop support supporting the bump stop, and a column connecting the guide ring to the bump stop support. The column is breakable relative to the guide ring and the bump stop support.

The bump stop may have a head, and the guide ring may be disposed between the head and the bump stop support.

The column may have a first portion, a second portion, and an intermediate portion between the first and second portions, the intermediate portion breakable relative to the first and second portions.

The column may include a neck between the bump stop support and guide ring.

The bump stop support may define a hole, and the shaft may include threads threadedly engaging the hole.

The guide ring may include a clip member.

The bump stop support may have an outer diameter and the guide ring may have an outer diameter that is greater that the outer diameter of the bump stop support.

The insert may include a plurality of columns including the column, the plurality of columns may connect the guide ring to the bump stop support.

The shaft may be elongated along a first axis, and the column may be elongated along a second axis parallel to the first axis.

The insert may include a second column extending from the guide ring toward the bump stop support, and the second column may include a distal end that is spaced from the bump stop support.

An insert includes a guide ring. The insert includes a bump stop support spaced from the guide ring. The insert includes a column connecting the guide ring to the bump stop support. The column is breakable relative to the guide ring and the bump stop support.

The column may be designed to fracture upon application of a threshold amount of force to the bump stop support.

The column may be designed to fracture upon application of a threshold amount of force to the bump stop support, the threshold amount may be greater than 300 newtons.

The column may include a neck.

The column may be breakable relative to the guide ring and the bump stop support when the column is in tension.

The bump stop support, the guide ring, and the column may be monolithic.

The insert may include a second column extending from the guide ring toward the bump stop support.

The second column may include a distal end that is spaced from the bump stop support.

The bump stop support may define a slot and the second column may be disposed within the slot.

The bump stop support may include a pair of protruding portions defining the slot therebetween.

With reference to the Figures, a support assembly 20 for a vehicle 22 includes a bump stop 24 having a shaft 26. The support assembly 20 includes an insert 28 having a guide ring 30 disposed around the shaft 26, a bump stop support 32 supporting the bump stop 24, and a first column 34 connecting the guide ring 30 to the bump stop support 32. The first column 34 is breakable relative to the guide ring 30 and the bump stop support 32.

The support assembly 20 absorbs energy when the first column 34 breaks, e.g., during impact of the vehicle 22 with a pedestrian outside the vehicle 22. Absorbing such energy reduces a likelihood 36 of injury of the pedestrian.

The vehicle 22, shown in FIG. 1, may be any type of passenger or commercial automobile such as a car, a truck, a sport utility vehicle, a crossover vehicle, a van, a minivan, a taxi, a bus, etc. The vehicle 22 may include a hood 36, shown in FIGS. 1-3. The hood 36 may cover an engine bay 38 of the vehicle 22. The hood 36 may move between an open position and a closed position. The hood 36 in the open position permits access to the engine bay 38. The hood 36 is in the closed position inhibits access to the engine bay 38.

The support assembly 20 supports the hood 36 of the vehicle 22. For example, the bump stop 24 may abut the hood 36 when the hood 36 is in the closed position. The support assembly 20 is designed to break upon application of a threshold amount of force, e.g., applied to the hood 36 and transferred to the bump stop 24 during an impact of the vehicle 22 with the pedestrian.

The support assembly 20 may be supported by a component of the vehicle 22, e.g., a panel 40, e.g., formed of sheet metal, in the engine bay 38 of the vehicle 22. For example, the support assembly 20 may be supported by a body of the vehicle, i.e., the panel 40 may be a component of the body. The support assembly 20 supports the hood 36 on the panel 40. The panel 40 may include a hole 42, and the support assembly 20 may be disposed within the hole 42.

The bump stop 24 may include the shaft 26 and a head 44. The bump stop 24 may be disposed within the hole 42 of the panel 40, e.g., the shaft 26 may be disposed within the hole 42 with the head 44 above the panel 40. The bump stop 24 prevents unwanted impact between the hood 36 and the panel 40 as the hood 36 is moved from the open position to the closed position, and the bump stop 24 positions the hood 36 relative to the panel 40 when the hood 36 is in the closed position.

The head 44 may abut the hood 36 in the closed position. The head 44 may be disposed between the hood 36 in the closed position and the panel 40. The head 44 may be made of rubber or any other suitable material.

Figure 2:
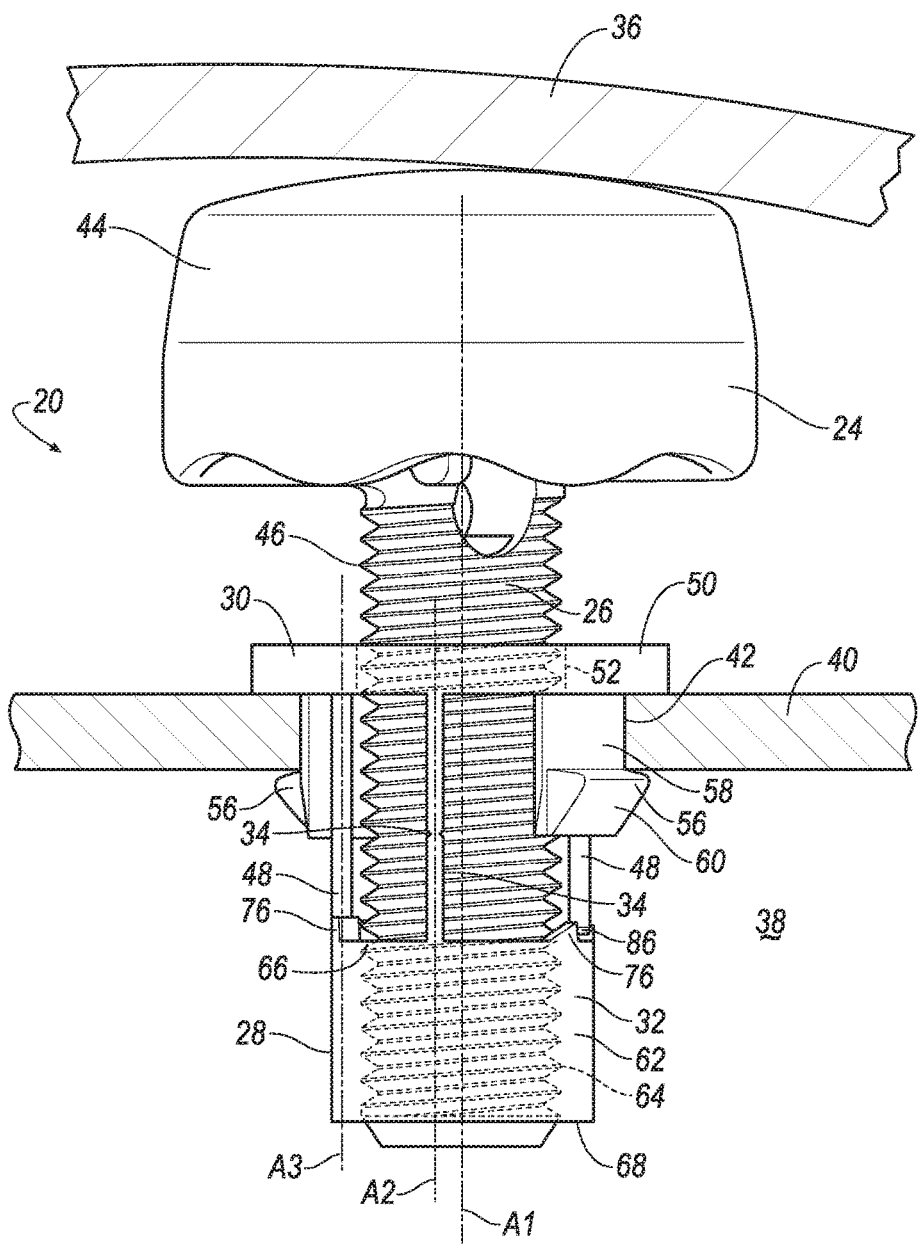
FIG. 2 is a side view of the support assembly prior to breaking and supported by a component of the vehicle.
Figure 6:
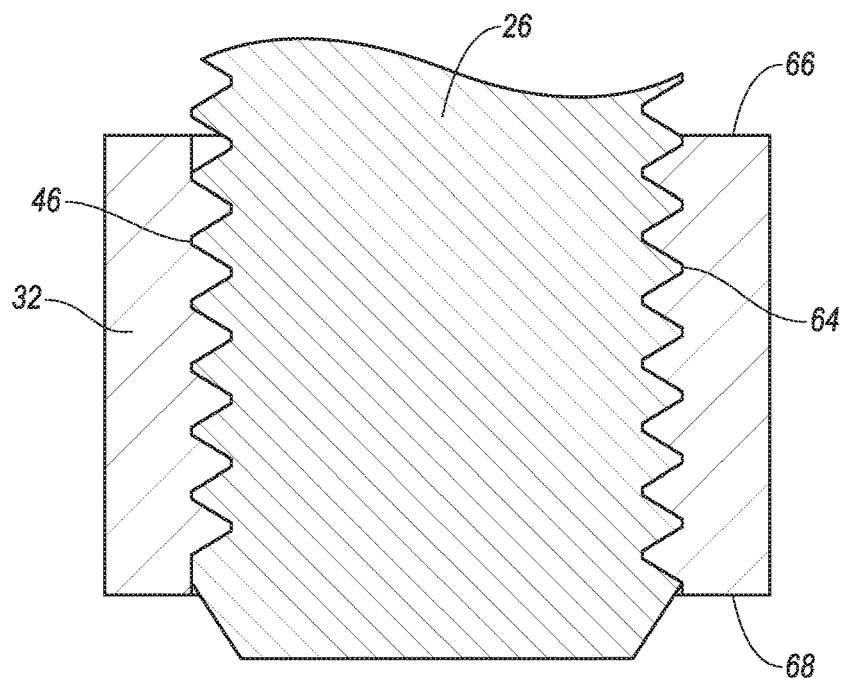
FIG. 6 is a cross section of a portion of one embodiment the support assembly.
Figure 7:
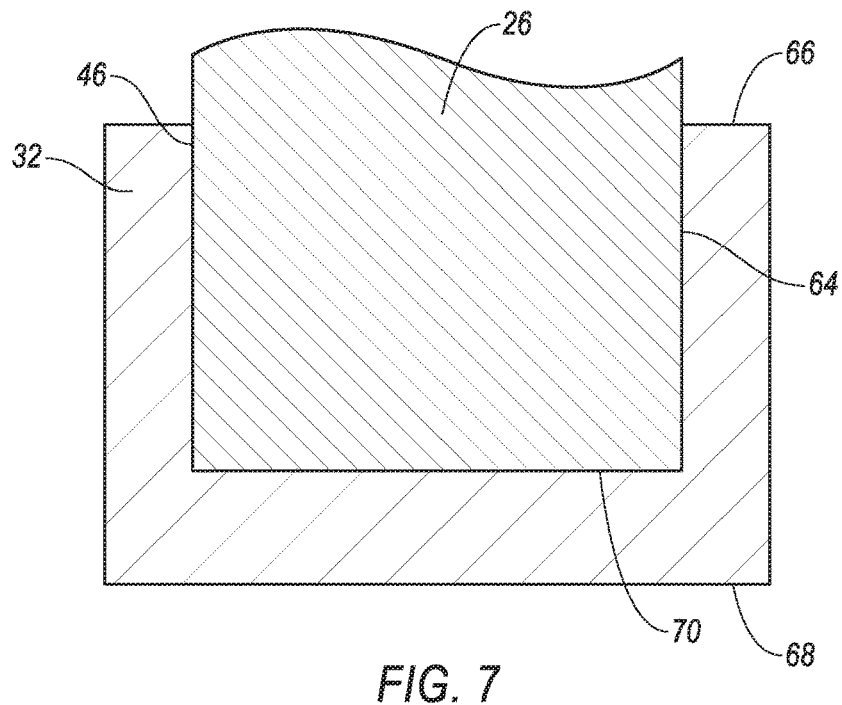
FIG. 7 is a cross section of a portion of another embodiment the support assembly.

The shaft 26 may extend from the head 44. The shaft 26 may be cylindrical. The shaft 26 is elongated along a first axis A1, as shown in FIG. 2. The shaft 26 may have an outer surface 46. The outer surface 46 of the shaft 26 may include threads, as shown in FIG. 6. The outer surface 46 of the shaft 26 may be smooth, as shown in FIG. 7. The head 44 and the shaft 26 may be monolithic, i.e., a single piece of material with no seams, joints, fasteners, or adhesives holding the head 44 and the shaft 26 together.

The insert 28 includes the bump stop support 32, the guide ring 30, and one or more first columns 34. The insert 28 may include one or more second columns 48. The insert 28 may be disposed within the hole 42 of the panel 40. For example, the one or more of the first columns 34 and the one or more of the second columns 48 may be disposed with the hole 42. The panel 40 may be disposed between the guide ring 30 and the bump stop support 32.

The bump stop support 32, the guide ring 30, the one or more first columns 34, and/or the one or more second columns 48 may be monolithic. i.e., a single piece of material with no seams, joints, fasteners, or adhesives holding it together. For example, the bump stop support 32, the guide ring 30, the one or more first columns 34, and/or the one or more second columns 48 may be formed simultaneously by injection molding, blow molding, casting, etc. In alternative to being monolithic, the bump stop support 32, the guide ring 30, the one or more first columns 34, and/or the one or more second columns 48 may be separate components secured to each other, e.g., via a fastener, adhesive, friction welding, etc.

Figure 3:
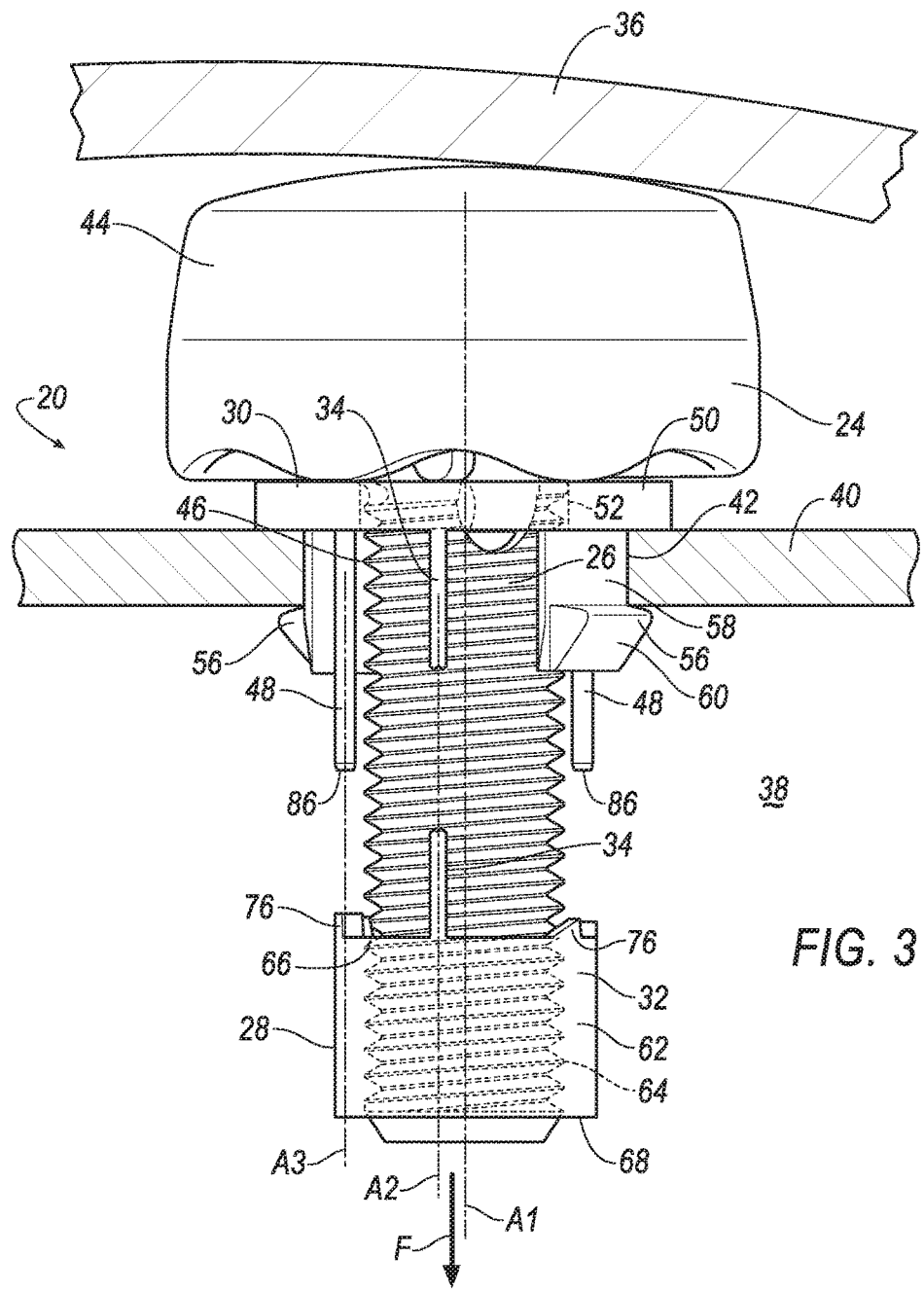
FIG. 3 is a side view of the support assembly subsequent to breaking and supported by a component of the vehicle
Figure 4:
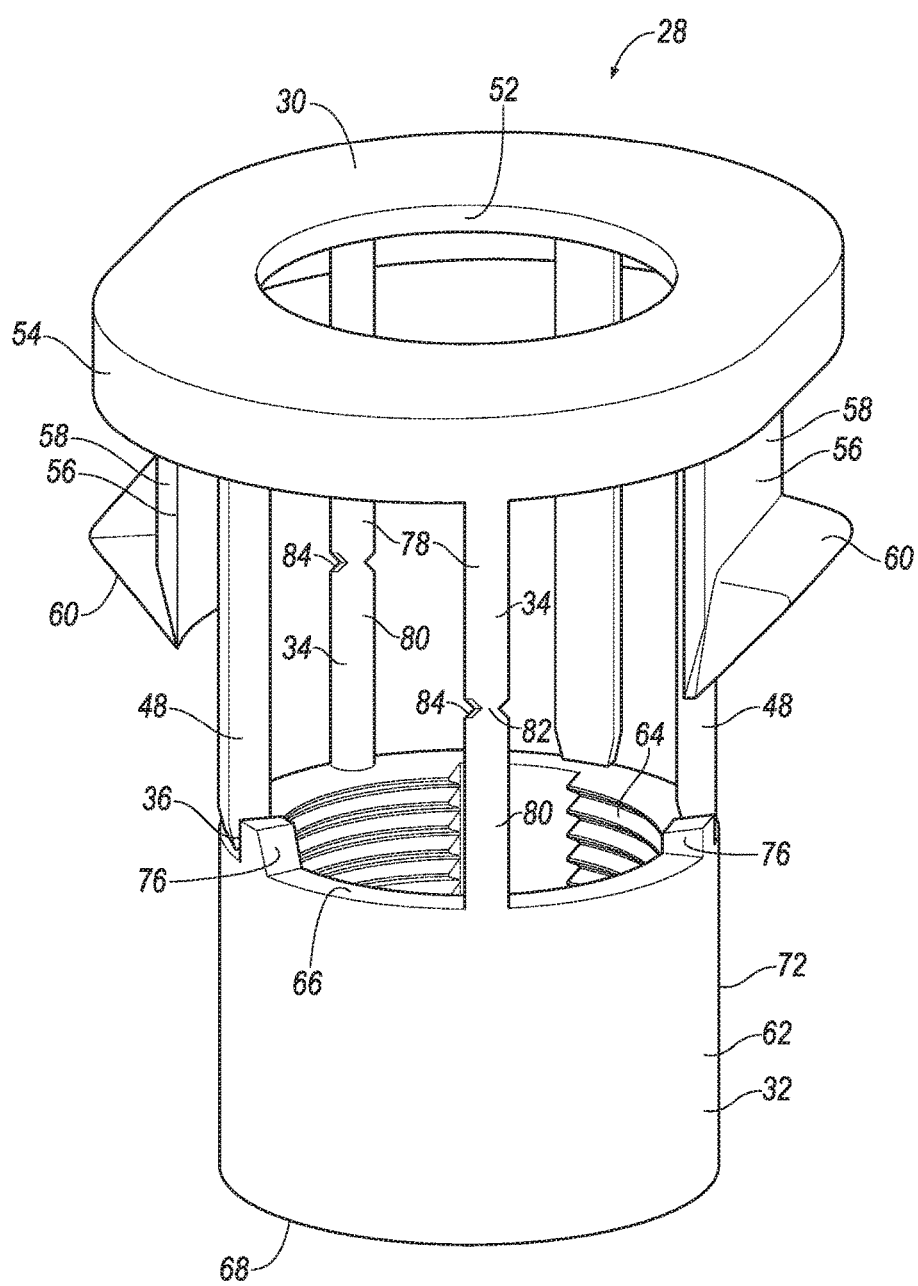
FIG. 4 is a perspective view of an insert of the support assembly.
Figure 5:
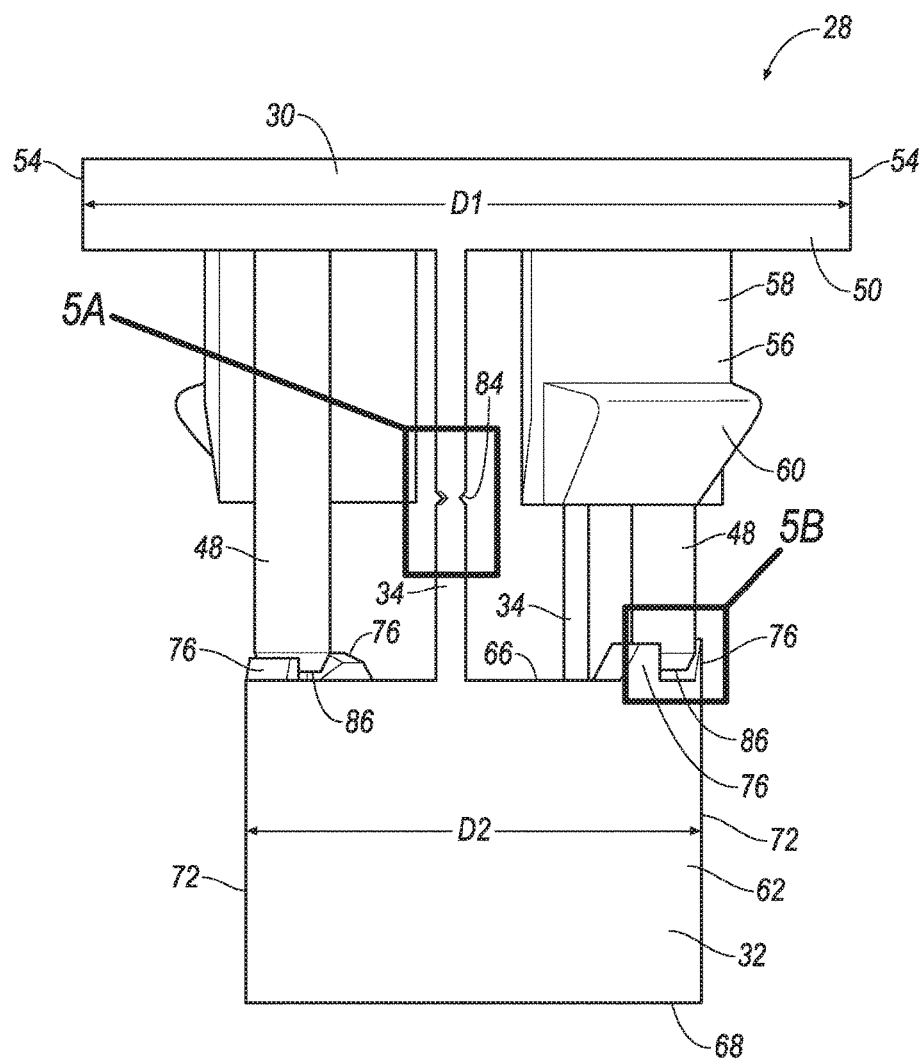
FIG. 5 is a side view of the insert of the support assembly.

The guide ring 30 may include a cylindrical main body 50 defining a hole 52, as shown in FIGS. 2 through 4. The guide ring 30 may have an outer diameter D1, as shown in FIG. 5. The outer diameter D1 may be based on an outer surface 54 of the main body 50. The outer diameter D1 of guide ring 30 may be greater that an outer diameter D2 of the bump stop support 32 (described below).

The guide ring 30 may be disposed around the shaft 26. For example, the shaft 26 may be disposed within the hole 52 of the guide ring 30. The guide ring 30 may abut the panel 40. The main body 50 of the guide ring 30 may be disposed between the head 44 and the bump stop support 32, e.g., along the first axis A1 of the shaft 26.

The guide ring 30 may include a clip member 56. The clip member 56 may extend from the main body 50 toward the bump stop support 32. The clip member 56 may include a first portion 58 and a second portion 60. The first portion 58 may be disposed within the hole 42 of the panel 40, with the panel 40 disposed between the main body 50 and the second portion 60 of the clip member 56.

The bump stop support 32 may support the bump stop 24. The bump stop support 32 may include a main body 62 having a cylindrical shape and defining a hole 64. The main body 62 may include a top surface 66 opposite a bottom surface 68. The hole 64 may extend entirely through the main body 50 from the top surface 66 to the bottom surface 68, as shown in FIG. 6. The hole 64 may extend partially through the main body 50 from the top surface 66 toward the bottom surface 68, the hole 64 terminating at a bottom surface 70 of the hole 64, as shown in FIG. 7.

The bump stop support 32 may have the outer diameter D2, as shown in FIG. 5. The outer diameter D2 of the bump stop support 32 may be based on an outer surface 72 of the main body 62 of the bump stop support 32. The outer diameter D2 of the bump stop support 32 may be less than the outer diameter D1 of the main body 50 of the guide ring 30.

The bump stop support 32 may support the shaft 26 of the bump stop 24. For example, the threads of the shaft 26 may be threadedly engaged with the hole 64, as shown in FIG. 6. For example, the shaft 26 may abut the bottom surface 70 of the hole 64 of the bump stop support 32, as shown in FIG. 7.

Figure 5A:
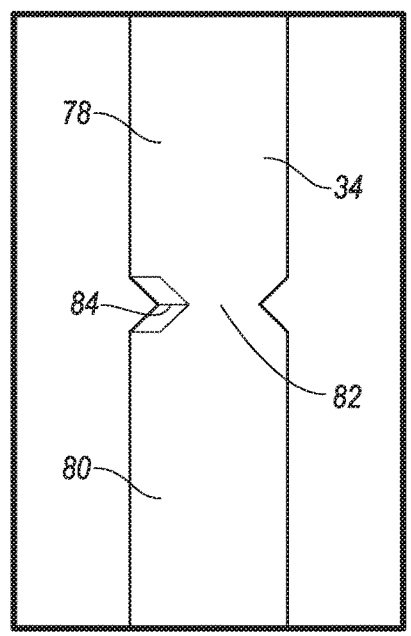
FIG. 5A is a magnified view of a portion of the insert.
Figure 5B:
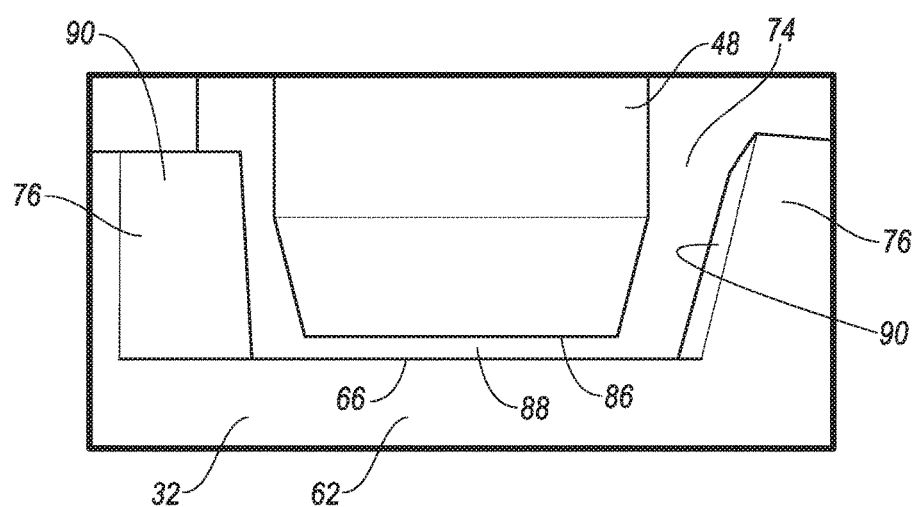
FIG. 5B is a magnified view of another portion of the insert.

The bump stop support 32 may define one or more slots 74, as shown in FIG. 5B. For example, the bump stop support 32 may include one or more pairs of protruding portions 76. The pairs of protruding portions 76 may extend from the top surface 66 and away from the main body 62 of the bump stop support 32. Each of the slots 74 may be defined between each of the pairs of protruding portions 76. Additionally or alternately, each of the slots 74 may extend from the top surface 66 of the main body 62 of the bump stop support 32 toward the bottom surface 68 of the main body 62 of the bump stop support 32.

The bump stop support 32 is spaced from the guide ring 30, e.g., with the one or more first columns 34 and the one or more second columns 48 disposed therebetween.

Each of the one or more first columns 34 connects the guide ring 30 to the bump stop support 32. For example, each of the one or more first columns 34 may be elongated between the guide ring 30 and the bump stop support 32 along a second axis A2, as shown in FIG. 2. The second axis A2 may be parallel to the first axis A1.

The one or more first columns 34 are breakable relative to the guide ring 30 and the bump stop support 32. To put it another way, the one or more first columns 34 may fracture, as shown in FIG. 3, when sufficient force is applied to the insert 28, e.g., to the bump stop support 32, while the remainder of the insert 28, e.g., the guide ring 30 and the bump stop support 32, may remain intact.

The one or more first columns 34 may be breakable relative to the guide ring 30 and the bump stop support 32 when the bump stop 24 applies tension to the one or more first columns 34. For example, the one or more first columns 34 may be breakable relative to the guide ring 30 and the bump stop support 32 when the bump stop 24 applies a force to the bump stop support 32 in a direction F away from the guide ring 30, and the panel 40 applies a reactionary force to the guide ring 30 in a direction opposite the force applied to the bump stop support 32, thereby causing tensile stress in the one or more first columns 34.

Each of the one or more first columns 34 may have a first portion 78, a second portion 80, and an intermediate portion 82 between the first and second portions 78, 80, as shown in FIG. 5A. The intermediate portion 82 may be breakable relative to the first and second portions 78, 80. To put it another way, the intermediate portion 82 may have a lower strength, e.g., tensile strength, than the first and second portions 78, 80. Accordingly, the first column 34 may fracture at the intermediate portion 82 when sufficient force is applied to the first column 34, while the first and second portions 78, 80 remain intact. For example, the intermediate portion 82 may be formed of a lower strength material than the first and second portions 78, 80. To put it another way, the intermediate portion 82 may be formed of a material having a first tensile strength, and the first and second portions 78, 80 may be formed of a material having a second tensile strength that is less than the first tensile strength.

Each of the one or more first columns 34 may include a neck 84, as shown in FIGS. 2, 4, 5, and 5A. The neck 84 may have a cross sectional area that is less than a cross sectional area of a remainder of the relative first column 34. The neck 84 may have a width that is less than a width of a remainder of the relative first column 34. The neck 84 may have a diameter that is less than a diameter of a remainder of the relative first column 34. The neck 84 may be located between the bump stop support 32 and guide ring 30. The neck 84 may be spaced from the bump stop support 32 and guide ring 30. The neck 84 may be a located at the intermediate portion 82 of the relative first column 34.

The one or more first columns 34 are designed to fracture upon application of a threshold amount of force to the bump stop support 32. The threshold amount of force may be in the direction F away from the guide ring 30 and toward the bump stop support 32. The threshold amount of force may be along the first axis A1. The one or more first columns 34 may be designed to fracture when the threshold amount of force is applied to one first column 34. The one or more first columns 34 may be designed to fracture when the threshold amount of force is distributed among more than one first column 34.

For example, when only one first column 34 connects the guide ring 30 to the bump stop support 32, such first column 34 is designed to fracture upon application of the threshold amount of force to the bump stop 24.

For example, when more than one first column 34, e.g., a plurality of first columns 34, connects the guide ring 30 to the bump stop support 32, such plurality of first columns 34 are designed to fracture upon application of the threshold amount of force to the bump stop support 32. To put it another way, each first column 34 of the plurality of first column 34 may be designed to fracture upon application of a fraction of the threshold amount of force to such first column 34. The fraction may be determined based how many first columns 34 are included in the plurality of columns. For example, when two first columns 34 connect the guide ring 30 to the bump stop support 32, each column 34 may be designed to fracture upon application of a half of the threshold amount of force to such column 34. For example, when four first columns 34 connect the guide ring 30 to the bump stop support 32, each column 34 may be designed to fracture upon application of a quarter of the threshold amount of force to such column 34.

The threshold amount of force may be based on a closing force and an impact force of the hood 36. The closing force is an amount of force applied to the bump stop support 32 by the hood 36 when the hood 36 is closed. The closing force may vary based on a weight of the hood 36, e.g., the heavier the hood 36, the greater the closing force. The closing force may vary based on other factors, such as how much force a user applies to close the hood 36, whether any dampeners support the hood 36, etc. The threshold amount should be such that the one or more first columns 34 does not break when the closing force is applied, e.g., when hood 36 is closed. For example, the closing force may be between 200 and 400 newtons. For example, the threshold amount of force may be greater than 300 newtons. The impact force is an amount of force applied to the bump stop support 32 when the hood 32 is impacted by a pedestrian, e.g., when the vehicle 22 is traveling above a threshold amount of speed, e.g., 10 miles per hour. The threshold amount should be such that the one or more first columns 34 breaks when the impact force is applied, e.g., when hood 36 is impacted by the pedestrian while the vehicle 22 is in motion. For example, the impact force may be between 800 and 2,000 newtons. For example, the threshold amount of force may be less than 1,200 newtons.

The one or more second columns 48 may each extend from the guide ring 30 toward the bump stop support 32. The one or more second columns 48 provide torsional support between the guide ring 30 and the bump stop support 32, e.g., without providing axial support. To put it another way, torque applied to the bump stop support 32, e.g., via the bump stop 24 and about the first axis A1, may produce stress in the one or more first columns 34 and the one or more second columns 48, while force applied to the bump stop support 32, e.g., via the bump stop 24 and along the first axis A1, in the direction F away from the guide ring 30 may produce tensile stress in the one or more first columns 34 and not in the one or more second columns 48.

Each of the one or more second columns 48 may be elongated along a third axis A3, as shown in FIG. 3. The third axis A3 may be parallel to the first axis A1. The third axis A3 may be parallel to the second axis A2.

Each of the one or more second columns 48 may extend to a distal end 86. The distal ends 86 may be spaced from the bump stop support 32. To put it another way, a gap 88 may be defined between each distal end 86 and the bump stop support 32, as shown in FIG. 5B.

Each of the one or more second columns 48 may be individually disposed within one of the slots 74. To put it another way, one of the second columns 48 may be disposed within one of the slots 74, and another of the second columns 48 may be disposed within another of the slots 74.

Each of the slots 74 may include opposing sides 90. The sides 90 may be spaced from the second column 48 disposed within the respective slot 74. One of the sides 90 of the slot 74 may abut the second column 48 disposed therein, e.g., when torque is applied to the bump stop support 32 causing the one or more first columns 34 to flex. Torsional support between the guide ring 30 and the bump stop support 32 may be provided when the second column 48 abuts one of the sides 90.

The adjectives "first" and "second" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bump stop assembly comprising:
    a bump stop having a shaft with a first end and a second end; and
    an insert having:
        a guide ring disposed around the shaft between the first end and the second end of the shaft;
        a bump stop support supporting the bump stop and connected to the second end of the shaft, the bump stop support axially spaced from the guide ring; and
        a column connecting the guide ring to the bump stop support;
        the column including a predetermined breaking region configured to break upon application of a threshold amount of force to the bump stop support for allowing relative movement of the shaft and the bump stop support with respect to the guide ring.

2. The bump stop assembly of claim 1, wherein the bump stop has a head, and the guide ring is disposed between the head and the bump stop support.

3. The bump stop assembly of claim 1, wherein the column has a first portion, a second portion, and an intermediate portion between the first and second portions, the intermediate portion includes the predetermined breaking region and is breakable relative to the first and second portions.

4. The bump stop assembly of claim 1, wherein the predetermined breaking region includes a neck between the bump stop support and guide ring.

5. The bump stop assembly of claim 1, wherein the bump stop support defines a hole, and the shaft includes threads threadedly engaging the hole.

6. The bump stop assembly of claim 1, wherein the guide ring includes a clip member.

7. The bump stop assembly of claim 1, wherein the bump stop support has an outer diameter and the guide ring has an outer diameter that is greater that the outer diameter of the bump stop support.

8. The bump stop assembly of claim 1, wherein the insert includes a plurality of columns including the column, the plurality of columns connecting the guide ring to the bump stop support.

9. The bump stop assembly of claim 1, wherein the shaft is elongated along a first axis, and the column is elongated along a second axis parallel to the first axis.

10. The bump stop assembly of claim 1, wherein the insert includes a second column extending from the guide ring toward the bump stop support, and the second column includes a distal end that is spaced from the bump stop support.

11. A bump stop insert comprising:
 a guide ring having a main body defining an unthreaded hole about an axis configured to receive a bump stop shaft;
 a bump stop support spaced from the guide ring and having a threaded hole configured to receive a bump stop shaft, the threaded hole coaxial with the unthreaded hole of the guide ring;
 the guide ring having a clip member extending from the main body toward the bump stop support parallel to the axis; and
 a column extending from the guide ring to the bump stop support parallel to the axis and connecting the guide ring to the bump stop support;
 the column including a predetermined breaking region configured to break upon application of a threshold amount of force to the bump stop support for allowing relative movement of the bump stop support with respect to the guide ring.

12. The bump stop insert of claim 11, wherein the threshold amount of force is greater than 300 Newtons.

13. The bump stop insert of claim 11, wherein the predetermined breaking region includes a neck.

14. The bump stop insert of claim 11, wherein the predetermined breaking region is breakable relative to the guide ring and the bump stop support when the column is in tension.

15. The bump stop insert of claim 11, wherein the bump stop support, the guide ring, and the column are monolithic.

16. The bump stop insert of claim 11, further comprising a second column extending from the guide ring toward the bump stop support.

17. The bump stop insert of claim 16, wherein the second column includes a distal end that is spaced from the bump stop support.

18. The bump stop insert of claim 17, wherein the bump stop support defines a slot and the second column is disposed within the slot.

19. The bump stop insert claim 18, wherein the bump stop support includes a pair of protruding portions defining the slot therebetween.

\* \* \* \* \*